United States Patent Office 2,939,856
Patented June 7, 1960

2,939,856

MODIFIED PHENOL-FORMALDEHYDE RESIN COMPOSITIONS AND PROCESS OF TREATING FIBROUS GLASS MATERIAL THEREWITH

Robert Steckler, Chagrin Falls, Ohio, and Jesse Werner, Holliswood, N.Y., assignors to General Aniline & Film Corporation, New York, N.Y., a corporation of Delaware No Drawing. Filed Mar. 11, 1958, Ser. No. 720,567

5 Claims. (Cl. 260—43)

The present invention relates to new modified phenol-formaldehyde resin compositions having excellent adhesion to glass and fibrous glass materials.

Various polymers and copolymers have been suggested as bonding agents for glass cloth, glass fibers, glass mats, roving, and the like. Polymers of allyl esters of saturated and unsaturated dibasic acids have been employed in the preparation of Fiberglas laminates and glass reinforced plastic objects. Blends of diallyl esters copolymerized with another monofunctional or polyfunctional vinyl monomer have yielded a wide variety of cross-linked copolymers which have been suggested as reinforcing or bonding agents for glass laminates. The principal disadvantage of such polymers and copolymers, when employed as a laminating agent, is that the resulting cured polymer or copolymer has poor adhesion to glass cloth, glass fibers, glass mats, and the like. If glass cloth, mats or glass fibers are impregnated with such polymers and copolymers and built into laminates, followed by final curing, the laminates do not exhibit their optimum properties such as flexural strength and modulus of elasticity.

It is known that phenols react with aldehydes (commonly formaldehyde) or ketones to form a variety of products. The nature of the resinous product depends on the choice of the phenol and the aldehyde or ketone and on the conditions of the reaction. Phenol-formaldehyde resins are of two main types. The resins resemble either the phenol alcohols of the dihydroxydiphenyl-alkanes in basic structure. If they are prepared with an excess of formaldehyde and an alkaline catalyst they will resemble the phenol alcohols and have methylol side or end groups. The molar ratio of formaldehyde to phenol used may vary in a ratio from 1:1 to 3:1 e.g.:

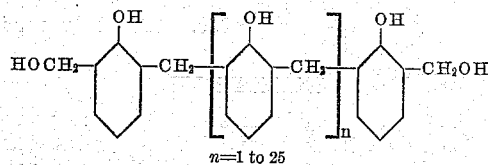

n=1 to 25

Such resins are often referred to as resoles. They are capable of being cured by the application of heat and sometimes acids, cure resulting through condensation of the methylol groups. By cooling the resin the reactions may be conveniently stopped, or at least effectively retarded, anywhere between the addition of the formaldehyde and the final curing process. To resume the reaction, the temperature is raised or an acidic catalyst is added. Since there is no sharp break in these reactions such resins have been termed the one-stage resins.

The majority of the one-stage resins employ formaldehyde as the aldehyde, although certain other aldehydes may be used. Formaldehyde is preferred because of its high reactivity and freedom from side reactions.

On the other hand, if the phenolic resin is prepared with an acidic catalyst and less than a mole of formaldehyde per mole of phenol the resin will resemble a dihydroxydiphenylmethane in structure, e.g., the chains are phenol ended. The molar ratio of formaldehyde to phenol used may vary anywhere from 1:2 to 1:1, e.g.:

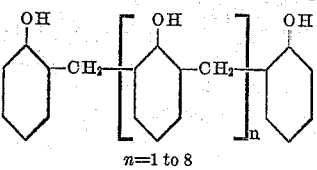

n=1 to 8

The resins, commonly referred to as novolak, are permanently soluble and fusible and will cure upon the addition of formaldehyde (in the form of paraformaldehyde), or hexamethylenetetramine. As the preparation of the novolak resin represents one process and the addition of the curing agent represents a separate and distinct process, resins based on a novolak resin and a curing agent are referred to as two-stage resins.

Phenol-formaldehyde resins, although having many desirable properties, have certain inherent drawbacks which prevent their full commercial use as reinforcing resins for laminating purposes. Processing conditions for phenol-formaldehyde resins are critical, and minor variations from the optimum conditions result in inferior and unusable laminates. However, even under the most carefully controlled conditions, the resulting laminates have low flexural strengths, and a low modulus. Phenol-formaldehyde resin laminates are brittle and are so lacking in adhesion that up to the present time they have rarely been used in commercial laminating applications.

It is an object of this invention to overcome the foregoing difficulties and to provide new modified phenol-formaldehyde resin compositions having excellent adhesion to various types of glass materials while still maintaining excellent water insensitivity.

Another object is to provide processes for preparing compositions of phenol-formaldehyde resins modified with a polymer of N-vinylimidazole, and glass material, such as fibers, strands, mats, cloth, flakes, and other glass materials.

Other objects and advantages will become more clearly apparent from the following specification.

We have found that phenol-formaldehyde resins are successfully modified to yield excellent adhesion to glass, glass fibers, strands, mat, cloth, and other glass materials, by employing a mixture containing from 80 to 98% by weight of a phenol-formaldehyde resin and from 20 to 2% by weight of a polymer of N-vinylimidazole. Such a resin mixture may be used not only as a laminating agent between two sheets or mats of glass, but may be used by itself as an unsupported film, with glass included in its composition as a reinforcing agent. Its use as a laminating agent yields excellent structural compositions, which also have the advantage of an inexpensive phenol-formaldehyde resin. Despite the fact that the modified composition may contain as much as 20% of a polymer of N-vinylimidazole, the resulting laminates and films, even after prolonged water immersion, display tenacious adhesion to glass, and with no apparent leaching.

The mixture of phenol-formaldehyde resin and polymer of N-vinylimidazole may be prepared in several ways. The phenolformaldehyde resin may be used in aqueous solution, to which an aqueous solution of the polymer of N-vinylimidazole may be added, the solution so adjusted that it contains a solid or resin content in the aforestated percent weight ratios. If a solid phenol-formaldehyde resin (molding powder) is used, part of the powder may be replaced by solid polymer of N-vinylimidazole in the aforestated percent weight ratios.

A mixture of the reaction product of N-vinylimidazole and formaldehyde, in solid or sodium form, may be blended with the solid or solution of the phenol-formaldehyde resin to also yield an improved thermosetting composition. Monomeric N-vinylimidazole may also be added during or after the initial condensation of phenol with formaldehyde to yield improved compositions. The polyvinyl-N-imidazole may also be coated onto the glass cloth, glass fibers, and the like, followed by addition of the phenol-formaldehyde resin.

The polyvinyl-N-imidazole employed in accordance with the present invention is characterized by the following general formula:

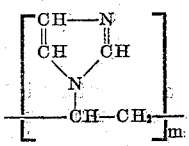

wherein m represents the extent of polymerization and is characterized by a molecular weight ranging from 5,000 to 100,000.

Copolymers containing a minimum of 80% N-vinylimidazole and 20% of other comonomers such as vinyl esters, styrene, vinyl toluene, acrylonitrile, methacrylonitrile, etc. can also be used.

The phenol-formaldehyde resins employed in accordance with the present invention are readily available on the open market in various grades, i.e., in solution and in powdered form, and both types may be employed in the preparation of resinous compositions having improved adhesion to glass and fibrous glass material. The procedures for preparing such phenol-formaldehyde resins are also well known to those skilled in the art, and references to literature need not be made herein.

However, for purposes of illustration, a procedure which yields a phenol-formaldehyde resin as a molding powder which may be used in the course of the present invention is as follows:

To a 3-necked resin flask, equipped with stirrer, thermometer and reflux condenser, were added 1.0 mole of phenol, 0.9 mole of formaldehyde (37% aqueous solution) and 2.0% of oxalic acid based upon the weight of the phenol. The mixture was heated with stirring to 60° C. over a period of 15 minutes. At this point, an exothermic reaction begins. Heating is continued, and the temperature rises to reflux, 96° C. in about 10 minutes. Heat is then reapplied, and the temperature held at reflux for two hours. A creamy emulsion is obtained which is now dehydrated in vacuo. The temperature during dehydration is permitted to drop to 80° C. When the batch clears, the temperature is then slowly raised to 125° C., which is sufficient to remove unreacted phenol and oxalic acid. Stirring is continued at 125° C. until a removed sample is hard and clear and has a melting point of about 90–100° C. The resin is then poured hot into a pan, cooled to room temperature, crushed and pulverized. The powdered phenol-formaldehyde resin is then blended with 10 parts of hexamethylenetetramine per 100 parts of resin powder until a uniform mixture is obtained.

The following examples will illustrate the various ways in which the modified phenol-formaldehyde resin compositions of the present invention may be prepared and employed. All parts given are by weight.

EXAMPLE I

A sheet of Fiberglas reinforcing mat, No. 216 Volan (bonded with a thermosetting polyester resin) was cut into three 5″ x 5″ pieces and each piece was gently fluffed to permit penetration of the powdered phenol-formaldehyde resin prepared as above. The glass mat and molding powder were then placed in a closed container in the ratio of 75 parts of molding powder and 25 parts of glass mat. The powder was then uniformly distributed throughout the glass with gentle shaking. The coated glass was then placed in a matched metal die, heated to 250° F. and 50 p.s.i. pressure, applied immediately. The mold temperature was raised to 320° F. during 10 minutes, and the pressure was kept at 50 p.s.i. for an additional 10 minutes. The mold was then cooled to about 150° F. and the resulting 5″ x 5″ x ⅛″ sheet removed.

Laminates so obtained were very uniform, and subjected to physical tests. The results obtained are shown in Table 1.

EXAMPLE II

Example I was repeated with the exception that 5% by weight of the phenol-formaldehyde molding powder was replaced by 5% by weight of polyvinyl-N-imidazole powder having a molecular weight of about 26,000. The results obtained are shown in Table 1.

EXAMPLE III

Example I was again repeated with the exception that 10% by weight of the phenol-formaldehyde molding powder was replaced by 10% by weight of the polyvinyl-N-imidazole powder having a molecular weight of about 12,000. The results obtained are shown in Table 1.

EXAMPLE IV

Example I was again repeated with the exception that 15% by weight of the phenol-formaldehyde molding powder was replaced by 15% by weight of polyvinyl-N-imidazole powder. The results obtained are shown in Table 1.

EXAMPLE V

A Fiberglas mat (No. 216), bonded with polyester resin, was cut into six 5″ x 5″ pieces and each of the pieces gently fluffed to permit penetrating of the phenol-formaldehyde resin (molding powder) as prepared above. The glass mats and the molding powder were then placed in a closed container in the ratio of 60 parts of molding powder and 40 parts of glass mat. The powder was then uniformly distributed by gentle shaking. The coated glass was then placed in a mold preheated to 330° F. and 3,000 lbs. pressure applied. After two minutes, the pressure was raised to 10,000 lbs. for a total cure of 15 minutes. The resulting 5″ x 5″ x ⅛″ sheet was then removed from the mold. The laminates obtained were uniform, and subjected to physical tests, the results of which are shown in Table 2.

EXAMPLE VI

Example V was repeated, with the exception that 5% by weight of the molding powder was replaced by 5% by weight of polyvinyl-N-imidazole powder having a molecular weight of about 26,000. The results obtained are shown in Table 2.

EXAMPLE VII

Example V was again repeated, with the exception that 10% by weight of the molding powder was replaced by 10% by weight of polyvinyl-N-imidazole powder having a molecular weight of about 26,000. The results obtained are shown in Table 2.

EXAMPLE VIII

Example I was again repeated with the exception that weight of the phenol-formaldehyde molding powder was replaced by 5% by weight of vinyl acetate-vinyl imidazole (80–20) copolymer. The results obtained are shown in Table 3.

EXAMPLE IX

Example 1 was again repeated with the exception that 15% by weight of the phenol-formaldehyde molding powder was replaced by 15% by weight of vinyl acetate-vinyl imidazole (80–20) copolymer. The results obtained are shown in Table 3.

Table 1

| | Parts Molding Powder | Parts Poly-Vinylimidazole | Flexural Strength (Dry) ASTM D-790-49T | Modulus (Dry) ASTM D-790-49T |
|---|---|---|---|---|
| Phenol-Formaldehyde, Resin of Example I | 100 | 0 | 17,200 | 800,000 |
| Resin Mixture of Ex. II | 95 | 5 | 21,200 | 830,000 |
| Resin Mixture of Ex. III | 90 | 10 | 23,300 | 875,000 |
| Resin Mixture of Ex. IV | 85 | 15 | 23,200 | 975,000 |

Table 2

| | Parts Molding Powder | Parts Poly-Vinylimidazole | Flexural Strength (Dry) ASTM D-790-49T | Resin Glass | Modulus (Dry) ASTM D-790-49T |
|---|---|---|---|---|---|
| Phenol-Formaldehyde, Resin Mixture of Ex. V | 100 | 0 | 21,000 | 60/40 | 890,000 |
| Resin Mixture of Ex. VI | 95 | 5 | 25,400 | 60/40 | 930,000 |
| Resin Mixture of Ex. VII | 90 | 10 | 28,000 | 60/40 | 1,050,000 |

Table 3

| | Parts Molding Powder | Parts Polyvinylacetate-polyvinyl-N-imidazole Copolymer | Flexural Strength (Dry) ASTM-D-790-49T | Modulus (Dry) ASTM-D-790-49T |
|---|---|---|---|---|
| Phenol-formaldehyde, Resin of Example 1 | 100 | 0 | 17,200 | 800,000 |
| Resin Mixture of Ex. VIII | 95 | 5 | 20,910 | 825,000 |
| Resin Mixture of Ex. IX | 85 | 15 | 21,100 | 950,000 |

We claim:

1. A thermosetting composition of matter for bonding glass and fibrous glass material comprising 80 to 98% by weight of a phenol-formaldehyde resin and from 20 to 2% by weight of a polymeric N-vinylimidazole selected from the class consisting of homopolymers of N-vinylimidazole and copolymers containing 80% of N-vinylimidazole and 20% of monomer selected from the group consisting of vinyl acetate, styrene, vinyl toluene, acrylonitrile and methacrylonitrile.

2. A thermosetting composition according to claim 1 wherein the phenol-formaldehyde resin has the ratio of 0.5:3 moles of formaldehyde to one mole of phenol.

3. A thermosetting composition according to claim 1 wherein the polymeric N-vinylimidazole has a molecular weight of 5,000 to 100,000.

4. A process of bonding fibrous glass material which comprises treating 25 to 40 parts by weight of said material with 60 to 75 parts by weight of a thermosetting composition comprising 80 to 98% by weight of a phenol-formaldehyde resin and from 20 to 2% by weight of polymeric N-vinylimidazole selected from the class consisting of homopolymers of N-vinylimidazole and copolymers containing 80% of N-vinylimidazole and 20% of monomer selected from the group consisting of vinyl acetate, styrene, vinyl toluene, acrylonitrile and methacrylonitrile, heating the treated material to a temperature ranging from 250° F. to 333° F. at a pressure of from 50 to 10,000 lbs. per square inch.

5. The process according to claim 4 wherein the polymeric N-vinyl imidazole has a molecular weight of 5,000 to 100,000.

References Cited in the file of this patent

UNITED STATES PATENTS

| | | |
|---|---|---|
| 2,336,792 | Langkammerer et al. | Dec. 14, 1943 |
| 2,603,621 | Craig et al. | July 15, 1952 |
| 2,809,953 | Werner et al. | Oct. 15, 1957 |